(No Model.)

J. H. WILLIAMS.
DEVICE FOR REMOVING BUTTER, &c., FROM PACKAGES.

No. 593,386. Patented Nov. 9, 1897.

Witnesses:
F. S. Hutchinson.
Chas. S. Widener.

Inventor.
John H. Williams,
per R. F. Osgood,
Attorney.

UNITED STATES PATENT OFFICE.

JOHN H. WILLIAMS, OF ALBION, NEW YORK.

DEVICE FOR REMOVING BUTTER, &c., FROM PACKAGES.

SPECIFICATION forming part of Letters Patent No. 593,386, dated November 9, 1897.

Application filed January 23, 1895. Serial No. 535,889. (No model.)

*To all whom it may concern:*

Be it known that I, JOHN H. WILLIAMS, of Albion, in the county of Orleans and State of New York, have invented a certain new and useful Improvement in Devices for Removing Butter or Similar Materials from Packages; and I do hereby declare that the following is a full, clear, and exact description of the same, reference being had to the drawings accompanying this application.

My improvement relates to devices for removing a given quantity of butter, lard, or any similar substance from a jar, crock, firkin, or other package without breaking it up or disturbing it; and the invention consists in the construction and arrangement of parts hereinafter described, and embodied in the claims.

Figure 1:
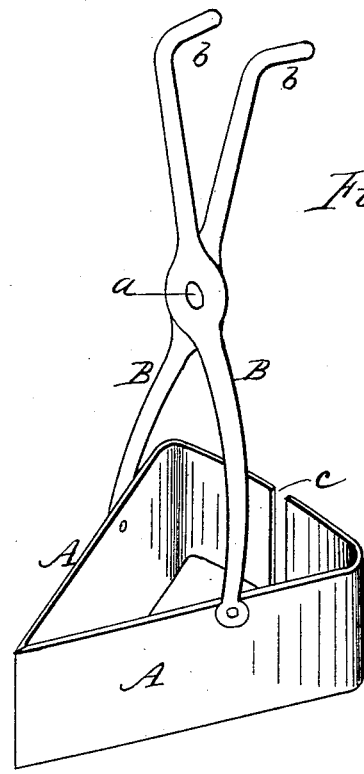
Figure 2:
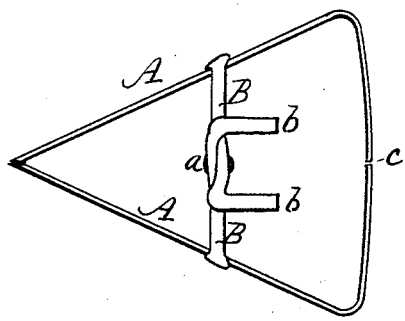
Figure 3:
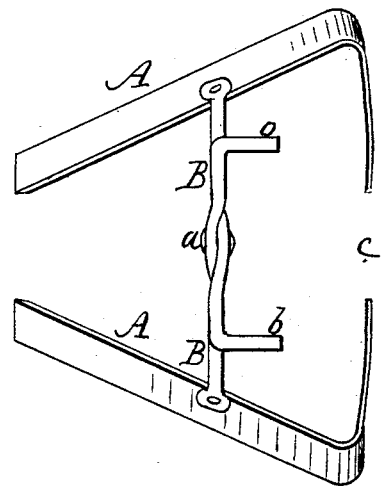

In the drawings, Figure 1 is a perspective view of the device in its normal closed position to be forced into the material. Fig. 2 is a plan view showing the device compressed to hold the material after said device has been inserted. Fig. 3 is a similar view showing the device opened or expanded to discharge the material after being removed from the package.

The cutting device, or that part which enters the substance, consists of two thin sharp vertical blades A A, of sheet metal or other material, having two pairs of meeting edges, to which are attached two arms B B, which preferably cross each other like those of a pair of tongs and are pivoted together at $a$. The upper ends have handles $b$ $b$, by which they are operated, or are arranged in some convenient way so as to be grasped by the hand. The pressing toward each other of the handles closes the blades together. The blades when fully closed form a box open at top and bottom. This box is shown as triangular, with one curved side, but the box may be of any other form than circular for the reason hereinafter described.

The cutter is of triangular form, the forward edges of the blades closing together and a space $c$ being left between the rear meeting edges, said rear ends being made of a shape to conform to the inner wall of the package. In closing the blades one pair of the meeting edges meets before the other pair can come together. To insert the device into the substance, the blades are closed in the position shown in Fig. 1—that is, sufficient pressure is applied to the handles to close the front ends together, but leaving the space $c$ at the rear ends open. After the device has been inserted in the substance, so as to fill the space between the blades, more pressure is applied to the handles, which closes up the space $c$ and compresses the blades, so as to hold the substance between them, while the device with the substance held is removed from the package, and after the device is fully closed, so that the rear meeting edges come together and close the space $c$, the device is turned, keeping said edges together, and, being of a form other than circular, twists the contained body of butter and separates it from the mass in the package. The holding power is sufficient to break the substance to be removed from that in the package, and it is removed without breaking it up and without disturbing the remainder in the package. After the device has been removed with its load the blades are opened by expanding the handles and the contents drop from place. The sides of the blades should be perfectly smooth and plated or covered with some non-corrosive material.

This device is very cheap and simple and obviates the necessity of any cutting or separating attachment at the bottom of the blades which has heretofore been used.

The triangular form of the device above shown and described is such that it can cut a continuous series of lumps around the circuit of the receptacle without leaving much waste, the outer end of the cutter fitting the side of the vessel and the inner or pointed end reaching to the center of the vessel. After the first cut has been made the following ones are made by one side of the cutter only, the other side simply fitting up to the side of the material left by the prior cut. The separate pieces of butter are therefore removed more easily than would otherwise be the case, and the material remaining in the vessel is in better condition for the succeeding cuts.

This device is not a butter-mold, but is intended for retail dealers for the purpose of cutting and removing butter from original packages in small quantities without loss.

Having described my invention, I do not claim, simply and broadly, a pair of blades attached to handles so as to be opened and closed; but

What I claim as new, and desire to secure by Letters Patent, is—

1. In a device for removing butter from packages, the combination of a pair of vertical blades, each bent at an angle and together forming a box open at top and bottom, said blades having two pairs of meeting edges, one pair of said edges, in closing the blades together, meeting before the other pair, and handles for operating said blades, substantially as and for the purposes described.

2. In a device for removing butter from packages, the combination of a pair of vertical blades, together forming a box open at top and bottom of non-cylindrical form, said blades having two pairs of meeting edges, one pair of said edges, in closing said blades together, meeting before the other pair, and handles for operating said blades, substantially as and for the purposes described.

3. In a device for removing butter from packages, the combination of a pair of vertical blades each substantially V-shaped and having one long and one short member and together forming a box open at top and bottom, said blades having two pairs of meeting edges, one pair of edges, in closing said blades, meeting before the other pair, and handles for operating said blades, substantially as and for the purposes described.

In witness whereof I have hereunto signed my name in the presence of two subscribing witnesses.

JOHN H. WILLIAMS.

Witnesses:
R. F. OSGOOD,
CHAS. A. WIDENER.